US010163292B1

(12) United States Patent
Romero

(10) Patent No.: US 10,163,292 B1
(45) Date of Patent: Dec. 25, 2018

(54) ADAPTER DEVICE FOR OBTAINING PAYMENTS AND MONITORING INVENTORY LEVELS OF A VENDING MACHINE

(71) Applicant: One Step Shot, LLC, Miami, FL (US)

(72) Inventor: Carlos Romero, Miami, FL (US)

(*) Notice: Subject to any disclaimer, the term of this patent is extended or adjusted under 35 U.S.C. 154(b) by 0 days.

(21) Appl. No.: 15/681,091

(22) Filed: Aug. 18, 2017

(51) Int. Cl.
| G07F 9/02 | (2006.01) |
|---|---|
| G07F 11/00 | (2006.01) |
| G06Q 20/20 | (2012.01) |
| G06Q 20/32 | (2012.01) |

(52) U.S. Cl.
CPC ............ G07F 9/026 (2013.01); G07F 11/002 (2013.01); *G06Q 20/203* (2013.01); *G06Q 20/3223* (2013.01); *G06Q 20/3278* (2013.01)

(58) Field of Classification Search
CPC ..... G07F 9/026; G07F 11/002; G06Q 20/203; G06Q 20/3223; G06Q 20/3278
USPC .................................................. 700/231–244
See application file for complete search history.

(56) References Cited

U.S. PATENT DOCUMENTS

| 8,484,086 B2* | 7/2013 | Pavlic | G06Q 20/04 235/375 |
|---|---|---|---|
| 8,533,315 B2* | 9/2013 | Godwin | H04L 12/66 235/381 |
| 9,686,184 B2* | 6/2017 | Rucker | H04W 4/70 |
| 2003/0074106 A1* | 4/2003 | Butler | G06Q 10/087 700/236 |
| 2005/0228720 A1* | 10/2005 | Pavlic | G06Q 20/04 705/16 |
| 2007/0227856 A1* | 10/2007 | Gopel | G07F 5/18 194/206 |
| 2008/0004748 A1* | 1/2008 | Butler | G06Q 30/02 700/244 |
| 2008/0140515 A1* | 6/2008 | Godwin | G06Q 10/06 705/7.24 |
| 2010/0023651 A1* | 1/2010 | Blachman | G07D 11/0063 710/18 |
| 2016/0240034 A1* | 8/2016 | Coleman | G07F 11/62 |
| 2017/0178099 A1* | 6/2017 | Truong | G06Q 20/201 |

* cited by examiner

*Primary Examiner* — Michael Collins
(74) *Attorney, Agent, or Firm* — Sanchelima & Associates, P.A.; Christian Sanchelima; Jesus Sanchelima

(57) ABSTRACT

The present invention provides a vending machine monitoring system that includes a first mobile phone housed inside the vending machine. The system also includes an adapter device which is configured to be installed or retro-fitted in a vending machine. The adapter device is communicably coupled with a controller of the vending machine to monitor and control the various operations of the vending machine. In particular, the adapter device acts a bridge between the various cables, which carries signals related to the operations of the vending machine, and the controller. Further, the first mobile device is installed in the vending machine which is in wireless or wired communication with the adapter device, and allows the vending machine to accept contactless payments and record the inventory levels and payment information. The adapter device, along with the computing device, provides additional functionality of remotely monitoring and controlling the vending machine.

10 Claims, 8 Drawing Sheets

Multi-Drop Bus / Internal Communication Protocol

Connector Pin-out:

Line 1 - 34 VDC
Line 2 - DC Power Return
Line 3 - N/C
Line 4 - Master Receive
Line 5 - Master Transmit
Line 6 - Communications Common

Peripheral Connector
Face View
Receptacle
(Sockets)

VMC / Bus Connector
Face View
Header
(Pins)

ADAPTER DEVICE FOR OBTAINING PAYMENTS AND MONITORING INVENTORY LEVELS OF A VENDING MACHINE

BACKGROUND OF THE INVENTION

1. Field of the Invention

The present disclosure generally relates to vending machines; and more particularly to an adapter device for upgrading the functionality of a new or an existing vending machine.

2. Description of the Related Art

Vending machines are often used for delivery of food items, such as beverages and snacks, or other commodities, such as newspapers, to consumers in restaurants, entertainment venues, retail outlets, office buildings, and other establishments. Vending machines acts as Point-Of-Sale (POS) devices which operates in a predominately autonomous fashion, thereby providing a cost-effective solution for sale of items. These machines allow for selection of a desired item by a customer via a user interface. The user interface of a conventional vending machine, generally, includes push buttons for the user to choose the desired item. Further, in some cases, the vending machines include controls for controlling lighting, temperature, and other climate conditions inside the vending machine. Vending machines may also include interfaces to accept payments, such as currency detectors, coin changers, bill validators, and the like. Some machines may also include cashless payment devices, such as credit/debit card readers, mobile payment instruments, etc.

Advances in vending machine technology have resulted in improved hardware and software to provide increased functionality in modern vending machines. These advances include vending machines which comes pre-fitted with contactless payment instruments, touch screens for product display and selection, etc. Such modern interfaces for product selection and making payments provide increased convenience to the consumer, especially in times, when touch screens have become ubiquitous and mobile payments have become preferred payment option for most consumers for retail purchases. On the other hand, existing vending machines which are already installed in various establishments remain hindered by their conventional capabilities. It may be contemplated that replacing such conventional vending machines altogether with modern vending machines will be a costly affair. Therefore, there is a need of a device which can upgrade an existing conventional vending machine with modern features, as discussed above.

Applicant believes that a related reference corresponds to U.S. Pat. No. 8,856,045 B1 (hereinafter referred to as '045 patent), which discloses a mobile-device-to-machine payment system for facilitating a cashless transaction for purchase of at least one product or service by a user from a payment accepting unit that preferably has input mechanisms. The user has a mobile device that has both short-range communication technology and long-range communication technology. The payment accepting unit is capable of dispensing at least one product or service. The system includes an adapter module and a server. The adapter module is associated with the payment accepting unit and has short-range communication technology for communicating with the short-range communication technology of the mobile device. The server has long-range communication technology for communicating with the long-range communication technology of the mobile device. The adapter module is for sending an authorization request for funds to the mobile device using short-range communication technology. The mobile device then forwards the authorization request for funds to the server using long-range communication technology. The server is for sending an authorization grant for funds to the mobile device using long-range communication technology. The mobile device then forwards the authorization grant for funds to the adapter module using short-range communication technology. The payment accepting unit dispenses the at least one product or service in response to receiving user input to the payment accepting unit input mechanism if the adapter module has received the authorization grant.

Although the disclosed mobile-device-to-machine payment system of the '045 patent provides convenient payment methods for a vending machine, the adapter, as described in the '045 patent, that provides such functionality to accept contactless payment methods, does not seem to be designed for installation or retro-fitting in an existing vending machine; but rather is integrated into the vending machine at the time of manufacturing thereof. Moreover, the '045 patent does not disclose any means to provide modem touch interface for product display and selection in an existing vending machine without undue design alterations. The present invention can be repaired and updated using the system within the vending machine remotely through the phone housed within the vending machine, instead of having to physically go, pick up the adapter and repair it.

In addition, existing technology is susceptible to being defrauded because once the user's mobile phone communicates with the payment reader the session is open inside the vending machine. If a user turns off their phone, the product could be dispensed without payment having been transmitted.

Other documents describing the closest subject matter provide for a number of more or less complicated features that fail to solve the problem in an efficient and economical way. None of these patents suggest the novel features of the present invention.

SUMMARY OF THE INVENTION

It is one of the main objects of the present invention to provide a device which may be retro-fitted in an existing vending machine to upgrade its functionality.

It is another object of this invention to provide a device which can configure an existing vending machine to accept contactless payments.

It is still another object of this invention to provide a device which can configure an existing vending machine to be remotely monitored and controlled in a secure manner.

It is still another object of the present invention to provide a device which can configure an existing vending machine to provide touch based interface for product display and selection.

It is yet another object of this invention to provide such a device which is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Illustrative embodiments of the present invention are described below. The following explanation provides specific details for a thorough understanding of and enabling description for these embodiments. One skilled in the art will understand that the invention may be practiced without such details. In some instances, well-known structures, processes and functions have not been shown or described in detail to avoid unnecessarily obscuring the description of the embodiments.

It shall be noted that unless the context clearly requires otherwise, throughout the description, the words "comprise," "comprising," "include," "including," and the like are to be construed in an inclusive sense as opposed to an exclusive or exhaustive sense; that is to say, in the sense of "including, but not limited to." Words using the singular or plural number also include the plural or singular number, respectively while adhering to the concepts of the present invention. Furthermore, references to "one embodiment" and "an embodiment" are not intended to be interpreted as excluding the existence of additional embodiments that also incorporate the recited features.

Figure 1:
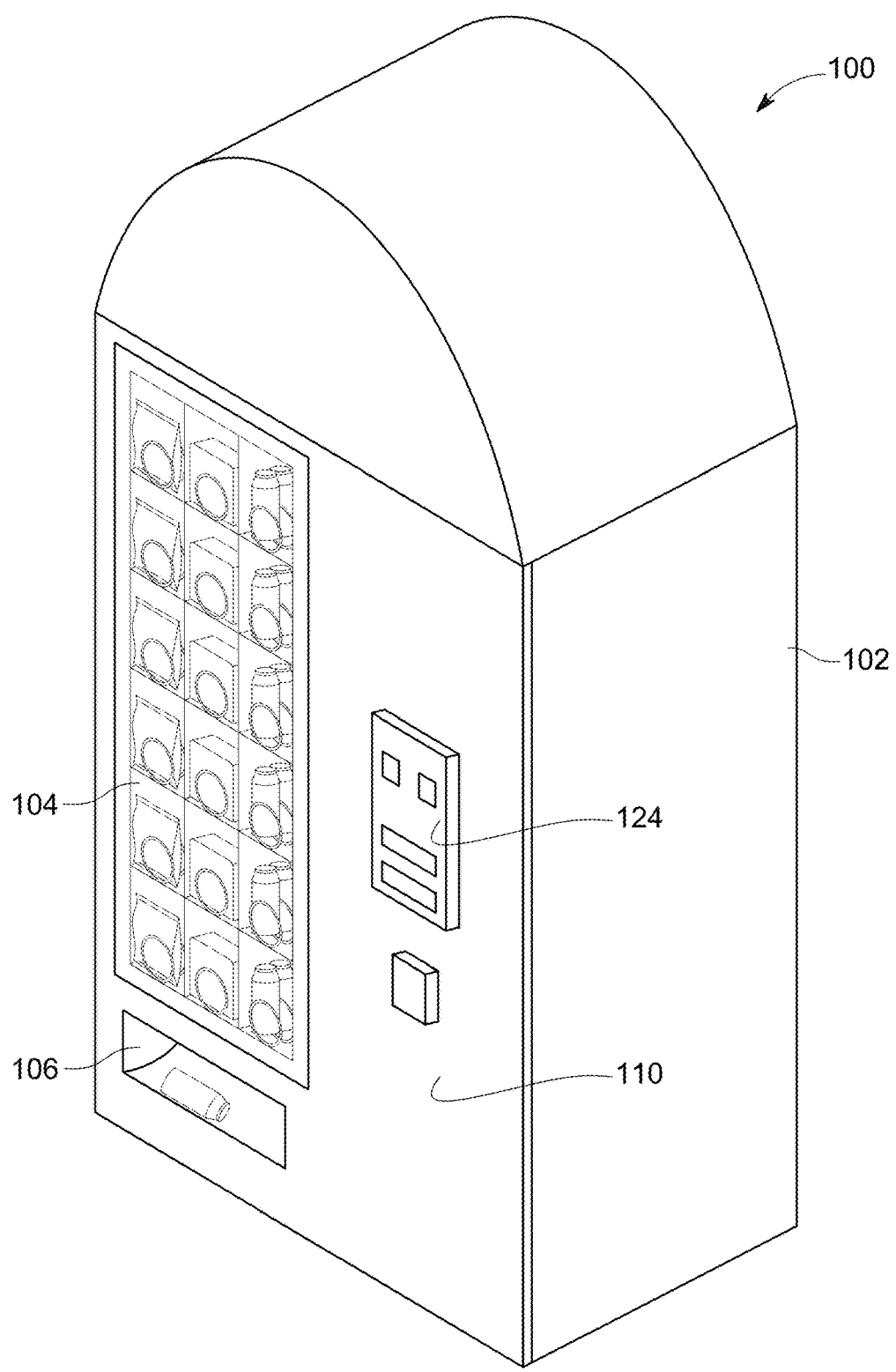
FIG. 1 illustrates a side isometric view of an exemplary vending machine, in accordance with one or more embodiments of the present disclosure.

FIG. 1 illustrates a perspective view of an exemplary vending machine 100. Herein, the term "vending machine" has been used in a broader sense and may include, but not limited to, a vending machine (for dispensing snacks), a soda/fountain dispenser (for dispensing beverages), a visicooler (for allowing the opening of a temperature-controlled product storage area), or any device capable of facilitating autonomous purchase of a good and/or a service. Typically, as illustrated in FIG. 1, the vending machine 100 includes a cabinet 102 which provides a housing in which its various components are installed. The cabinet 102 provides a storage area 104 in the vending machine 100 which is typically visible from the outside of the vending machine 100 by means of a transparent glass or the like, and in which various products to be sold are displayed in a predefined manner. A chute (not shown) is provided which connects the storage area 104 with a dispensing door 106 from which the product is dispensed, as required, to be picked-up by a consumer from outside of the vending machine 100. Various systems and devices employed for controlling dispensing of a desired product from the vending machines are well known in the industry and thus have not been described herein in detail for the brevity of the disclosure.

Figure 2:
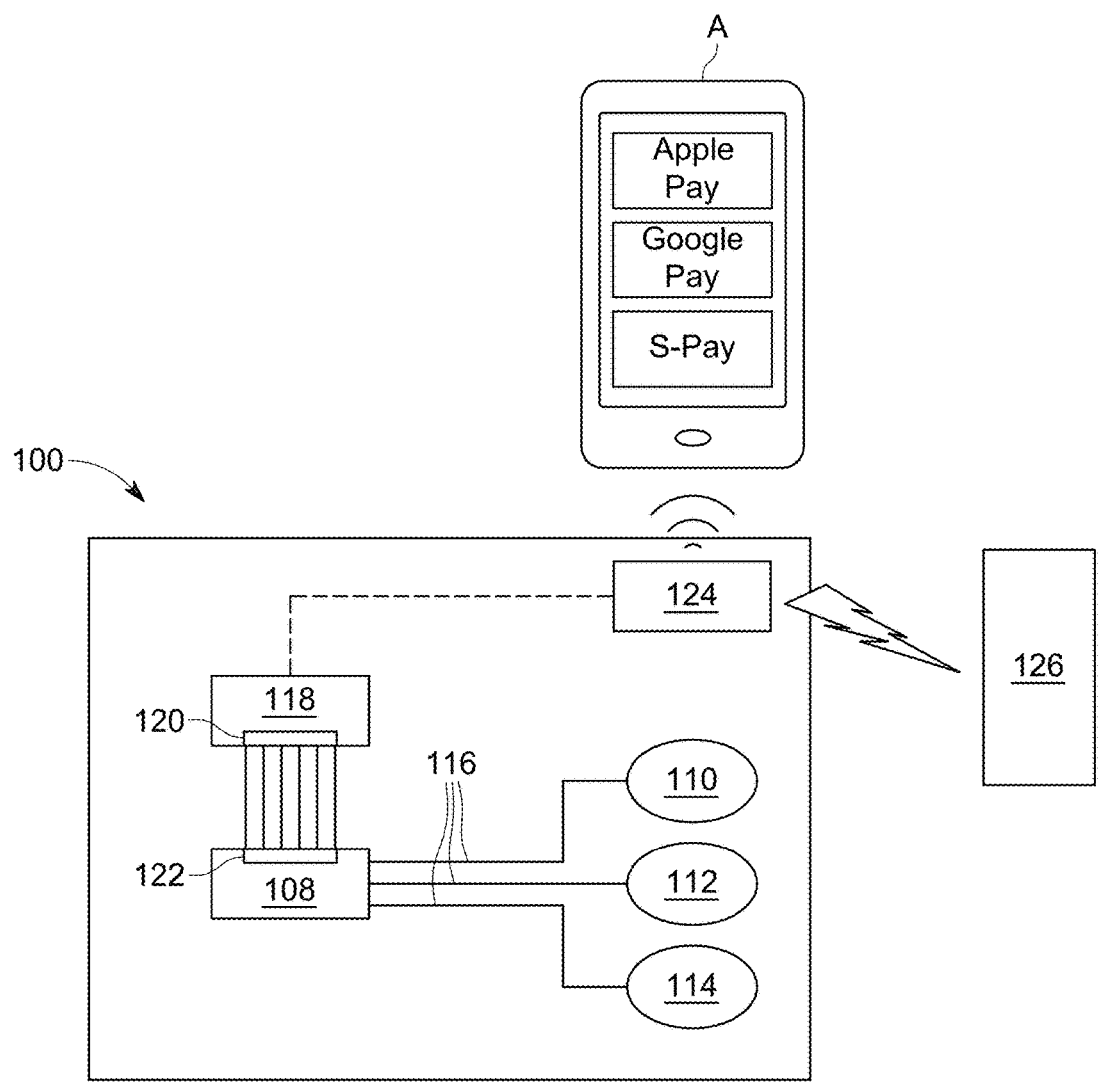
FIG. 2 illustrates a schematic diagram of the vending machine, in accordance with one or more embodiments of the present disclosure.

FIG. 2 illustrates a schematic view of the vending machine 100 of the present disclosure. The vending machine 100 may be of electrical and/or electro-mechanical configuration. In particular, the vending machine 100 includes a controller 108 configured to perform various operations of the vending machine 100. The controller 108, as described herein, may be any processor-based or microprocessor-based system including systems using microcontrollers, reduced instruction set computers (RISC), application specific integrated circuits (ASICs), field-programmable gate arrays (FPGAs), graphical processing units (GPUs), logic circuits, and any other circuit capable of executing the functions required by the vending machine 100. The controller 108 may, generally, be installed inside the cabinet 102 of the vending machine 100. In some alternate examples, the controller 108 may be located remotely from a location of the vending machine 100. In other examples, the controller 108 may include a plurality of electronic processing devices located at one or more sites, such as inside the cabinet 102 of the vending machine 100 and/or at one or more locations remotely from the location of the vending machine 100.

The vending machine 100 may further include a number of devices and systems (commonly referred to as "peripherals") that are, generally, installed inside the cabinet 102. For example, the vending machine 100 may include various payment devices 110, such as a coin acceptor/validator, a bill acceptor/validator, a cashless credit/debit card terminal, and similar devices. Further, the vending machine 100 may include a climate control system 112 for maintaining suitable temperature and humidity levels inside the storage area 104 of the vending machine 100, especially in case of perishable food items being stored inside the storage area 104. In some examples, the vending machine 100 may further include a lightning control system 114 to illuminate the storage area 104 of the vending machine 100 to properly display the products stored therein to a consumer. These peripherals are well known in the vending machines industry and have not been described herein in detail for the brevity of the disclosure. In operation, such peripherals may include various switches, sensors and motors which interface with the controller 108.

Further, the vending machine 100 includes a plurality of cables 116, generally, running inside the cabinet 102 and which communicably couple the various peripherals of the vending machine 100 with the controller 108 therein. Typically, each cable has a predefined function, e.g. to transmit the transaction information from the payment devices 110 (e.g. whether the payment is made by using a credit card, coins or bills); or to manage the power supplied to the climate control system 112, the lightning control system 114, etc. The controller 108 may implement the protocols and communications necessary to operate the attached peripherals in the vending machine 100. In one example, the vending machine 100 may use a standard serial bus interface, such as the MDB (Multi-Drop Bus/Internal Communication Protocol) standard defined by NAMA (National Automatic Merchandising Association), which provides electronic communication between the various peripherals and the controller 108 for electronically controlled vending machines.

In an embodiment, an adapter device 118 is provided in the vending machine 100 of the present disclosure. The adapter device 118 may act as a bridge between the controller 108 and the multiple cables 116 inside the vending machine 100; i.e., the cables 116 inside the cabinet 102 may be communicatively coupled to the adapter device 118 from one end, and the other end of the adapter device 118 may be communicatively coupled to the controller 108. This way, the adapter device 118 may be in a position to control the supply of the signals from the various peripherals to the controller 108 and vice-versa, and thereby manage the overall operation of the vending machine 100. In most cases, the adapter device 118 may replicate all received signals from various peripherals via the cables 116 and transmit the same signals to the controller 108.

In the present embodiment, the adapter device 118 may generally be a discrete standalone component, shaped and sized for installation in the vending machine 100. In particular, the adapter device 118 may include an input port 120 or an array of input ports 120 to receive the connecting ends of the multiple cables 116 therein. Further, the adapter device 118 may include an output port 122 from which a serial bus or the like may be connected to an input terminal of the controller 108. In most cases, the adapter device 118 may be retro-fitted in the vending machine 100 without much alteration of the existing design and/or systems. In one embodiment of the present disclosure, the adapter device 118 may include circuitry or a chip (not shown) to enable communication via Bluetooth and/or Near-Field Communication (NFC) standards. This allows the adapter device 118 to act as a transmitter to wirelessly communicate with other Bluetooth, NFC or wireless communication devices (e.g., a smartphone), as will be described in the subsequent paragraphs.

In one example, the adapter device 118 may be a retrofit device. As used herein, the term "retrofit device" may generally refer to any device that is added to a standard machine as a post-production and/or after-market add-on to add to and/or alter functionality thereof, e.g. an "after-market" retrofit device. In other examples, the retrofit device may be a device coupled to a machine at the time of manufacture where such device adds to and/or alters the functionality of the manufactured machine as described herein, e.g. an Original Equipment Manufacturer (OEM) retrofit device. The following disclosure has been described in terms of the adapter device 118 being installed in an existing vending machine, such as the vending machine 100 of the present disclosure. However, as discussed, the same adapter device 118 may be installed at the time of manufacturing or assembly of a new vending machine 100 without any limitations. It may be contemplated by a person skilled in the art that the adapter device 118 may be installed in an existing vending machine 100 by first disconnecting the connections between the controller 108 and the multiple cables 116; e.g. at the node where the multiple cables 116 may be soldered to a circuit board of the controller 108. Thereafter, the open ends of the multiple cables 116 may be connected to the various input ports 120 of the adapter device 118. Further, a serial bus cable may be connected to the output port 122 of the adapter device 118 from one end and its other end is connected to the input terminal of the controller 108.

Further, in an embodiment, the vending machine 100 includes a computing device 124 installed outside or inside the cabinet 102. In an example, the computing device 124 may be retro-fitted to an existing vending machine, like the vending machine 100 of the present disclosure. The computing device 124 may be mounted to the outside of the cabinet 102 by any known mounting method, such as, but not limited to, the use of a mounting case fixed via a fastening arrangement to the cabinet 102. In one example, the computing device 124 may be a smartphone or a tablet computer which is communicably coupled with the adapter device 118 of the vending machine 100 via wireless communication protocols, like Bluetooth and/or NFC. Alternatively, the computing device 124 may be connected to the adapter device 118 via a wired connection, which also provides power to the computing device 124.

It may be understood that the adapter device 118 and the computing device 124 may have a two-way communication therebetween. In the vending machine 100, the adapter device 118 may receive the information related to the dispensing of the items from the dispensing system, transactions information from the payment devices 110, the information about temperature and humidity level from the climate control system 112, and the information about the status of lights from the lightning control system 114, etc., via the multiple cables 116 as well as the controller 108. The adapter device 118 may further transmit the received information to the computing device 124, via the standard wireless communication protocol. In some cases, the computing device 124 may send instructions to the adapter device 118 to control one or more operations of the vending machine 100.

In one embodiment, the computing device 124 of the present disclosure may further be configured to facilitate contactless payments by the vending machine 100. For this purpose, the computing device 124 may implement the Bluetooth or NFC chip therein which may communicate with a smartphone of a consumer. The consumer on selection of a desired product would be presented with a bill amount to pay, e.g. on a display of the computing device 124. The consumer may tap his/her smartphone 'A' on the computing device 124 to pay the generated bill, if satisfied. It may be contemplated that the payment method may include any contactless payment protocol, such as Apple-Pay™, Android-Pay™, S-Pay™, etc. In other examples, the bill amount may be communicated by the computing device 124 directly to the smartphone of the consumer, where the consumer can confirm the payment by any known method, such as entering PIN, using bio-metric verification, tele-verification, etc. Thus, the addition of the computing device 124, along with the adapter device 118, may add the popular functionality of the contactless payment to an existing vending machine, such as the vending machine 100 of the present disclosure.

Figure 3:
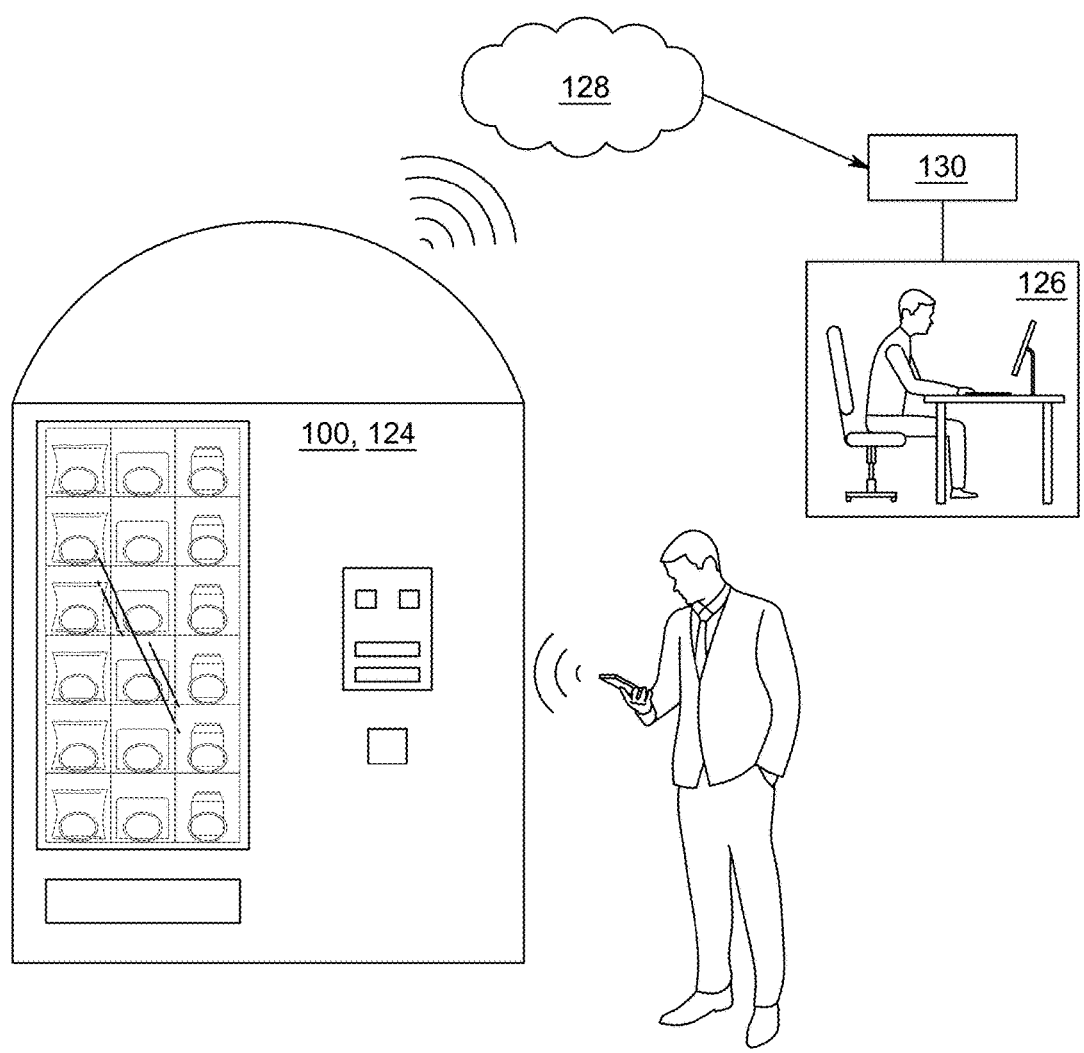
FIG. 3 represents the operating environment of the present invention wherein a vending machine manager is remotely obtaining the inventory and payment information using a second mobile phone outside the vending machine or alternatively in a remote computerized station.

In an embodiment, the vending machine 100 may be communicatively connected to a remote system 126 for allowing a user, such as an owner of the vending machine 100, to keep a track of the inventory in the vending machine 100 and monitor payments and transactions made therein. FIG. 3 illustrates an exemplary configuration for communicatively connecting the computing device 124, in the vending machine 100, with the remote system 126. As illustrated, the computing device 124, or the vending machine 100, may be connected to a cloud based network 128. For such purposes, the computing device 124 may include means for connecting to Internet/communication network, such as a Wi-Fi module, a GSM/Cellular module or the like. The computing device 124, via the Internet/communication network, may be communicably coupled with the cloud based network 128 which configures a server 130 to establish a connection between the vending machine 100 and the remote system 126. In an alternate example, the adapter device 118 may include the internet connection means to communicate directly with the remote system 126.

It may be understood that the computing device 124 may be configured to transmit the received information, related to the current status, from the adapter device 118 to the remote system 126. The remote system 126, in turn, may be configured to provide vending services to an owner of the vending machine 100, such as keeping track of the inventory inside the vending machine 100, verifying cashless payment information, updating of operating system's software code of the vending machine 100, etc. based on the received information. Such operation of the remote system 126 may be appreciated by a person skilled in the art and have not been described herein in detail. In some embodiments, the remote system 126 may also be able to process the received information and generate instructions based on the same. Further, the remote system 126 may send these instructions to the computing device 124 to control the various systems of the vending machine 100, such as, but not limited to, the climate control system 112 and the lightning control system 114 for managing energy usage of the vending machine 100. It may be contemplated that at the vending machine 100, the computing device 124 in turn passes such instructions to the adapter device 118 which, in some cases, translate the received instructions to commands by implementing the controller 108 for controlling the required operations of the vending machine 100.

Figure 4:
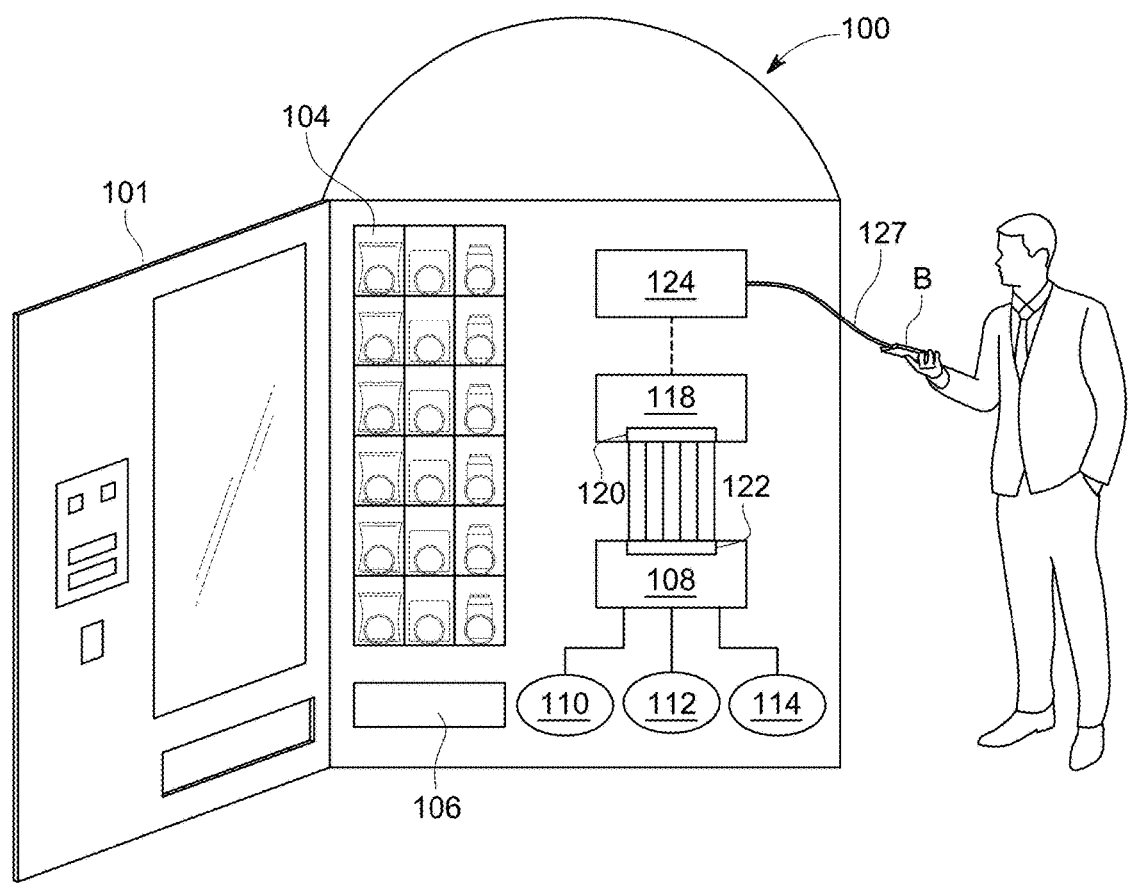
FIG. 4 shows an operating environment wherein a vending machine manager is shown able to obtain payment and inventory information by being hardwired to the machine using a wired means.
Figure 5:
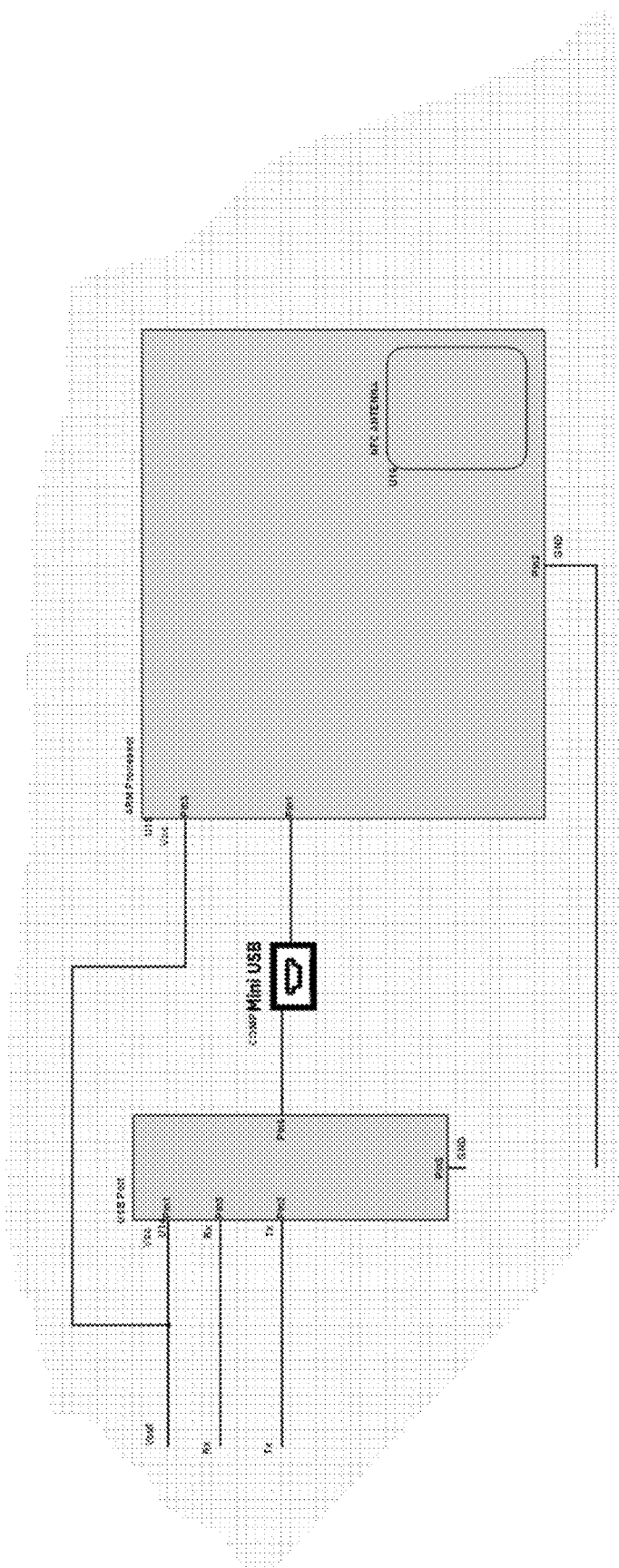
FIG. 5 is a schematic showing the relationship between the vending machine's control board and adaptor.
Figure 6:
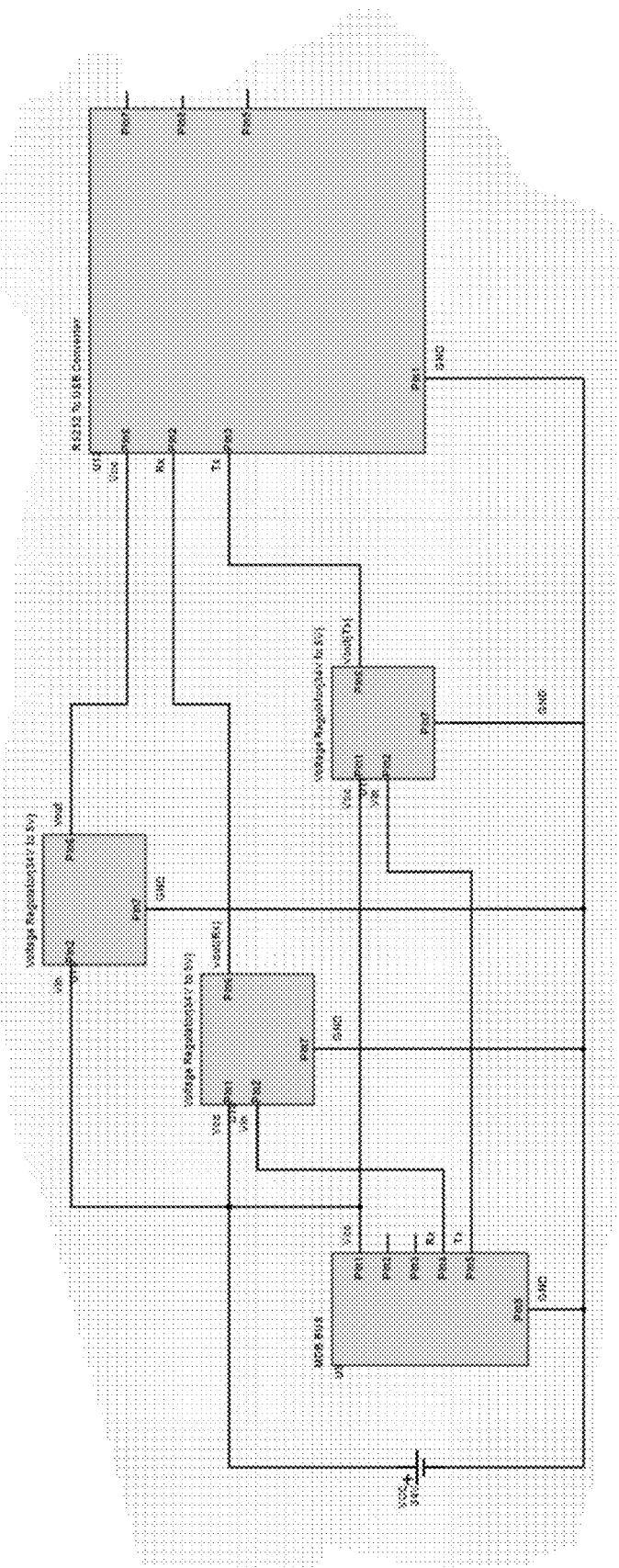
FIG. 6 is a schematic of the processors used with the present invention.
Figure 7:
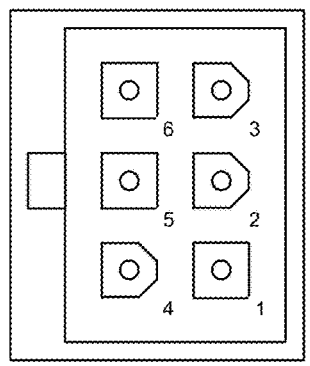
FIG. 7 shows the bus connectors used with the adaptor of the present invention.
Figure 7:
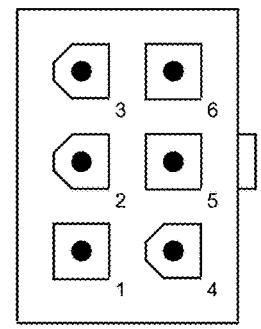
Figure 8:
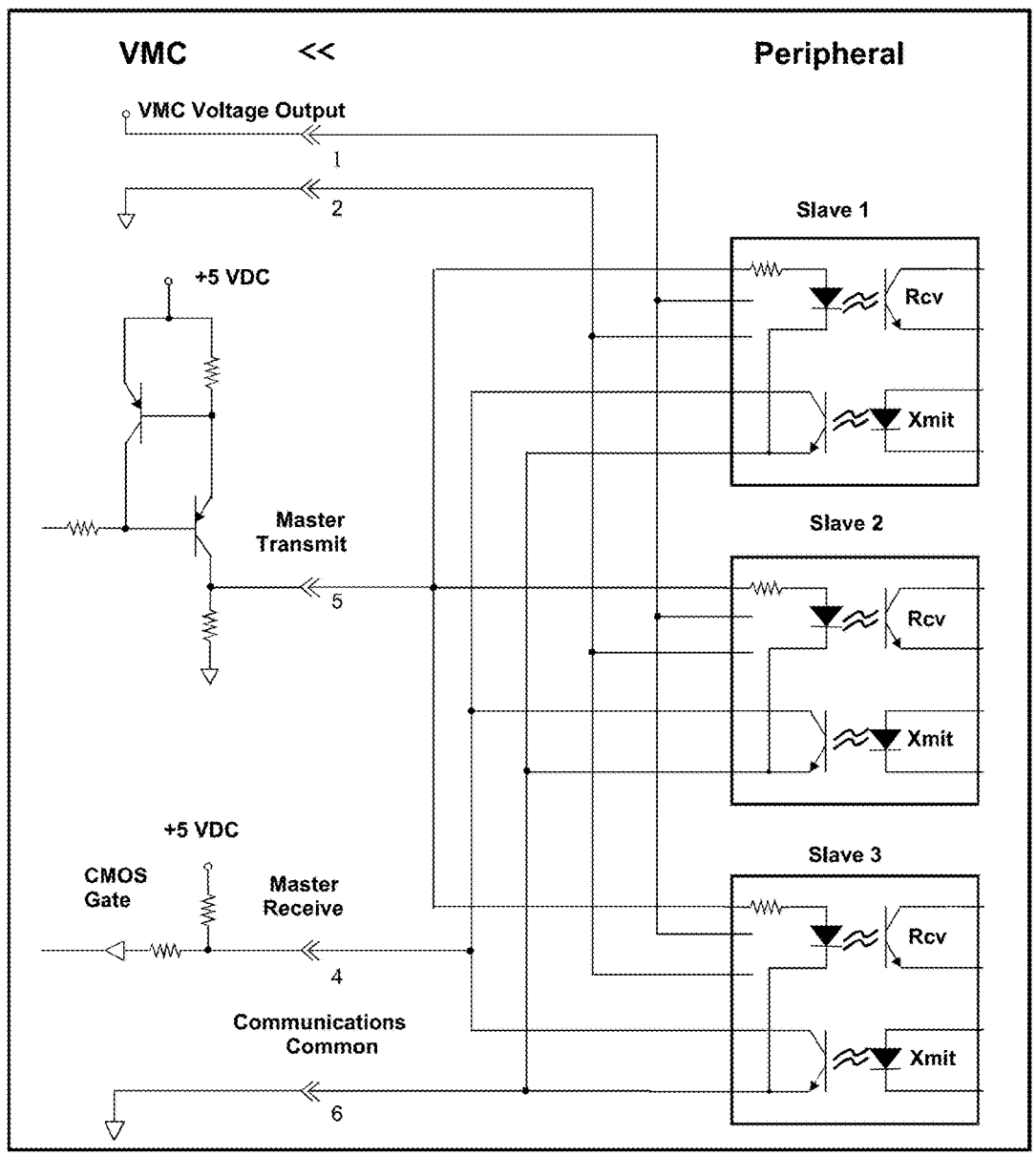
FIG. 8 shows a schematic of the electrical controls used inside the vending machine.

FIG. 4 illustrates an alternate embodiment to allow a user, such as an owner of the vending machine 100, to keep a track of the inventory in the vending machine 100 and monitor payments and transactions made therein. As illustrated, the user may first open a door 101 of the vending machine 100 to access a port 125 of the computing device 124. It maybe contemplated that the door 102 may normally be in locked state and the user may open the door by unlocking it via some key, passcode or the like. When the port 125 is accessible, the user may connect its user device 'B' to the port 125 by plugging a cable 127 in order to download the desired information about the operation of the vending machine 100, such as the inventory and payment information. It may be contemplated that, in such case, the user device 'B' may have a compatible application to display the received information in a manner understandable to the user, such as in a graphical manner.

In some examples, the computing device 124 may provide additional functionality by replacing the existing push buttons, number pad and other input interfaces of the vending machine 100. In such cases, the computing device 124 may be installed over the said existing input interfaces of the vending machine 100; or the computing device 124 may be installed at some other suitable location making the other interface devices as secondary input means, or in some cases redundant. The touch screen display of the computing device 124 may be configured to display the selection of products that are currently stored in the vending machine 100 and are ready to be dispensed. The touch screen provides the benefit that the list of products may be updated on real-time basis based on the stock of the products left in the dispensing system. Further, the touch screen of the computing device 124 may provide more intuitive interface for selection of the product, as the consumer may be able to select a product by touching a photo of the same product as displayed on the screen thereof. It may be understood that the computing device 124 may transmit the information related to the selection of the product to the adapter device 118, which in turn operate the dispensing system, via the controller 108, to move the product from the storage area 104 to the dispensing door 106 for the consumer to pick-up.

The combination of the adapter device 118 and the computing device 124 may enable an existing vending machine, such as the vending machine 100, to be upgraded to accept modern contactless payment means. Further, the addition of the computing device 124 allow for remote monitoring and controlling of the vending machine 100, say, for example by a vending service agency or an owner of the vending machine 100. In some cases, additional systems, such as alarm systems may also be integrated with the computing device 124 for theft protection and the like. Furthermore, the computing device 124 may enhance the operation of the vending machine 100 by providing additional functionality of touch interface for product display and selection. Therefore, the present disclosure provides a simple and cost-effective way of upgrading an existing vending machine to provide functionalities as are introduced in most of the modern vending machines.

The present invention allows for vending machine managers to monitor inventory levels in real-time and remotely. Systems currently known in the art require a manager to be physically present to obtain inventory information. Also, the present invention can provide information regarding sales made using any type of financial instrument, including cash, coins, debit/credit cards, and contactless payments. The payment reader monitors all types of payments made using tangible instruments and the adapter and/or first mobile phone can take into account the contactless payments. The adapter can be connected to the coils holding the products to monitor the amount of units sold and determine the inventory remaining based on the amount of items initially stocked.

The present invention can be configured to work with $3^{rd}$ party applications for receiving payments such as Google Wallet or Apple Pay, or even gift cards. The present invention allows vending machine owners or customers to connect their phones with the adapter or the phone housed within or outside the vending machine using Near Field Communication, Bluetooth, hardwiring, or a combination thereof.

The present invention's adapter can include six ports that receive six cables used for power, ground, transmit and receive data. The adapter communicates with payment readers using Multiple Drop Bus. The adapter is connected to the housed mobile phone using USB, Bluetooth, Wi-Fi, cellular, or Near Field Communication. The adapter is connected to the vending machine's payment reader through a hub or bus connector. In one embodiment, the adapter does not send information outside the vending machine, only to the mobile phone.

The present invention is connected to the CPU of the vending machine to keep track of sales made using any payment method, current technology only keeps track of payments through their system. Also, the present invention can remotely through the phone add more companies and/or applications that are compatible with the payment receiver of the vending machine for contactless payments.

When customers approach the machine their phones registered in the server which recognizes them and uses the balance they have available and allows purchases. The phone inside the machine has an application downloaded that communicates with the server.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A vending machine inventory monitoring device, comprising: a vending CPU, a first mobile phone housed within a vending machine that is connected to an adapter, a controller connected to a plurality of vending machine peripherals, said first mobile phone adapted to transmit inventory and sales information derived from payment information provided by said vending CPU to a server, said adapter includes a USB port, a converter, a RS-232 to USB transformer, and an MDB bus connecting said adapter to said controller.

2. The vending machine monitoring device of claim 1 wherein said first mobile phone accepts contactless payments.

3. The vending machine monitoring device of claim 1 wherein a second mobile phone is located outside the vending machine and configured to collect the inventory information transmitted by said first mobile phone.

4. The vending machine monitoring device of claim 2 wherein said first and second mobile phone communicate using Bluetooth or Near-Field Communication, without requiring a downloadable application.

5. The vending machine monitoring device of claim 1 wherein the first mobile phone is configured to receive data instructions to update the vending machine's firmware.

6. The vending machine monitoring device of claim 1 wherein payment is transmitted from a user's mobile phone to said first phone that is connected to said adapter, said adapter connected to a control unit of said vending machine that gives instructions to release items upon payment being received by said first mobile phone.

7. The vending machine monitoring device of claim 1 wherein said first mobile phone is always on and transmitting inventory and payment information to said remote computerized station via Wi-Fi or cellular data.

8. The vending machine monitoring device of claim 1 wherein said plurality of vending machine peripherals include a payment reader, said payment reader being a coin reader, a bill reader, and/or a card reader.

9. The vending machine monitoring device of claim 1 wherein said RS-232 to USB transformer is a voltage transformer that transforms 34 volts coining from said controller to 5 volts when it enters said first mobile phone, thereby keeping the first mobile phone charged.

10. The vending machine monitoring device of claim 1 wherein said USB port is located on a first end of said adapter and said MDB is located on a second end of said adapter, said first end and said second end are opposite or adjacent each other.

* * * * *